US005472612A

United States Patent [19]

Maxwell

[11] Patent Number: 5,472,612
[45] Date of Patent: Dec. 5, 1995

[54] SUPERCRITICAL FLUID EXTRACTION SYSTEM AND METHOD OF OPERATION

[75] Inventor: Robert J. Maxwell, Southhampton, Pa.

[73] Assignee: The United States of America as represented by the Secretary of Agriculture, Washington, D.C.

[21] Appl. No.: 106,681

[22] Filed: Aug. 16, 1993

[51] Int. Cl.[6] .................................................. B01D 11/02
[52] U.S. Cl. ........................... 210/634; 96/105; 210/181; 210/198.2; 210/656; 210/774
[58] Field of Search ................................ 210/137, 198.2, 210/634, 656, 232, 175, 181, 774; 422/70, 89, 103, 109, 261; 436/178, 180; 251/331, 335.2; 95/82; 96/105

[56] References Cited

U.S. PATENT DOCUMENTS

| | | | |
|---|---|---|---|
| 4,313,828 | 2/1982 | Brownlee | 210/198.2 |
| 4,597,943 | 7/1986 | Sugiyama | 422/70 |
| 4,860,793 | 8/1989 | Hartl | 251/335.2 |
| 5,094,741 | 3/1992 | Frank et al. | 210/656 |
| 5,147,538 | 9/1992 | Wright et al. | 210/634 |
| 5,151,178 | 9/1992 | Nickerson et al. | 210/198.2 |
| 5,173,188 | 12/1992 | Winter et al. | 210/634 |
| 5,198,115 | 3/1993 | Stalling et al. | 210/634 |
| 5,240,603 | 8/1993 | Frank et al. | 210/656 |
| 5,250,195 | 10/1993 | Winter et al. | 210/634 |
| 5,340,475 | 8/1994 | Cortes et al. | 210/198.2 |

FOREIGN PATENT DOCUMENTS 9206058  4/1992  WIPO .................................. 422/256

OTHER PUBLICATIONS

Levy and Houck, *American Laboratory*, pp. 36R–36Y, (Apr. 1993).
Maxwell et al., Symposium on New and Emerging Approaches to the Development of Methods in Trace–Level Analytical Chemistry, Aug. 17–21, 1992.
Porter et al., *J. of Chromatographic Science*, v. 30, pp. 367–373 (Sep. 1992).
Sandra et al., *J. of High Resolution Chromatography*, v. 13, pp. 284–286 (Apr. 1990).
Saito et al., *Chromatographia*, v. 25(9), pp. 801–805 (Sep. 1988).

*Primary Examiner*—Joseph W. Drodge
*Attorney, Agent, or Firm*—M. Howard Silverstein; John D. Fado; Gail E. Poulos

[57] ABSTRACT

A supercritical fluid extraction system and method for extracting a sample from a matrix by use of supercritical fluid and collecting components of the matrix in a solid phase extraction collection column. This system includes a variable restriction valve for depressurizing the fluid with entrained sample and an integral adapter directly connected at a first end with the valve and directly sealingly engaging the collector column and having a second end for passage of the depressurized fluid and sample with matrix components into the collector column.

28 Claims, 5 Drawing Sheets

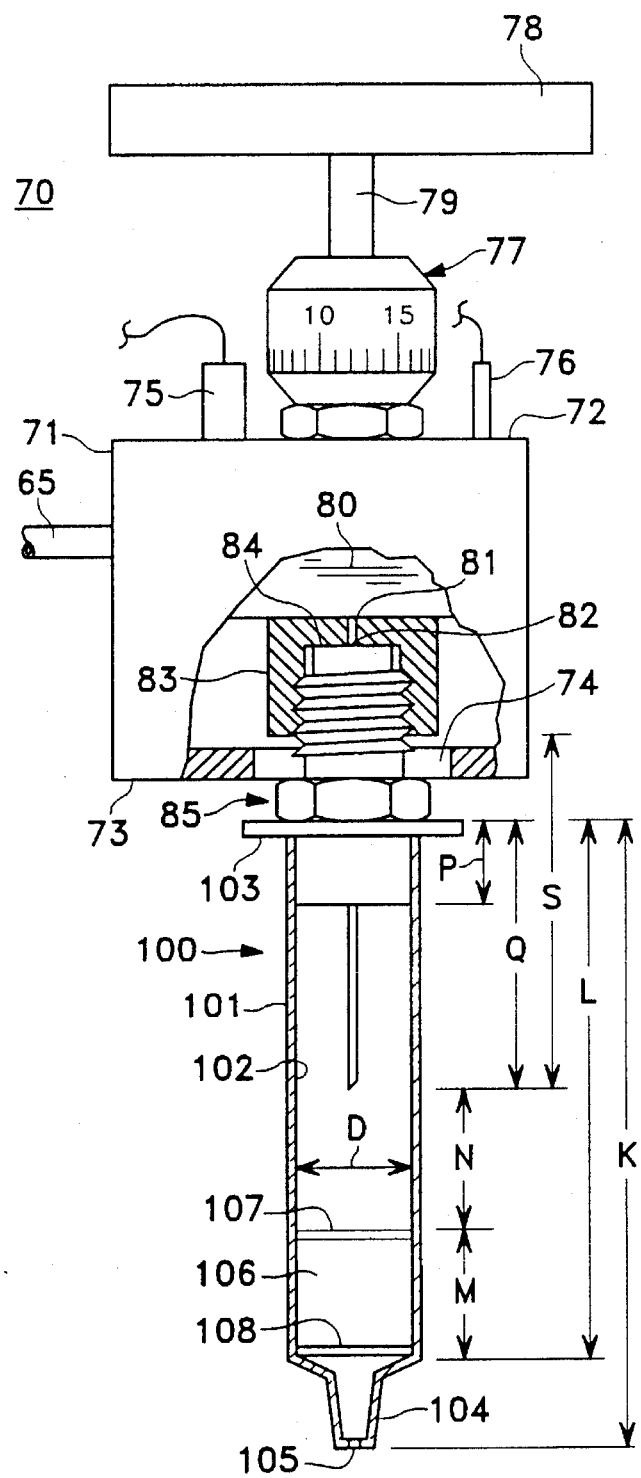
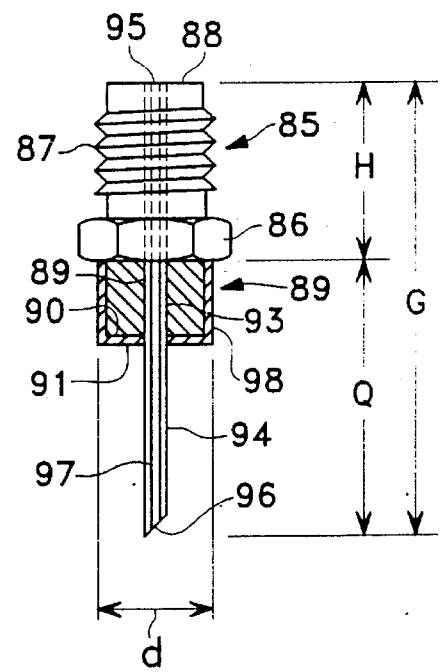
FIG. 4
FIG. 5

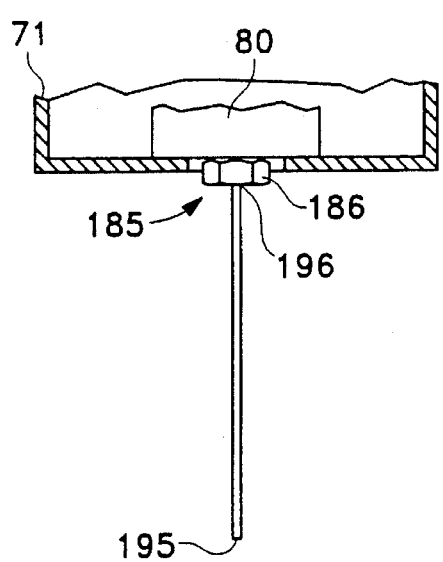
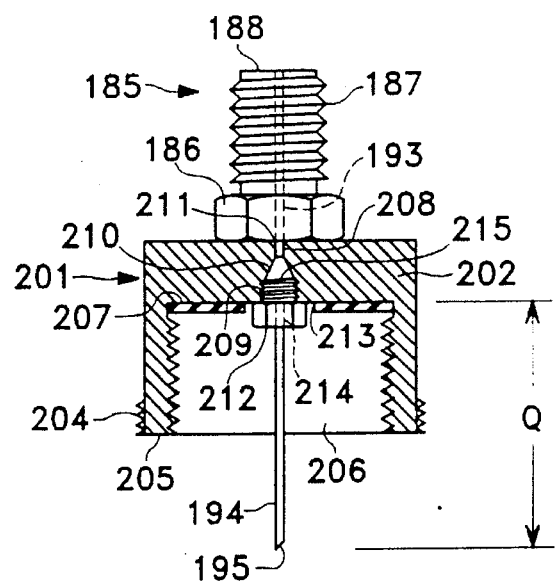
FIG. 6    FIG. 7a
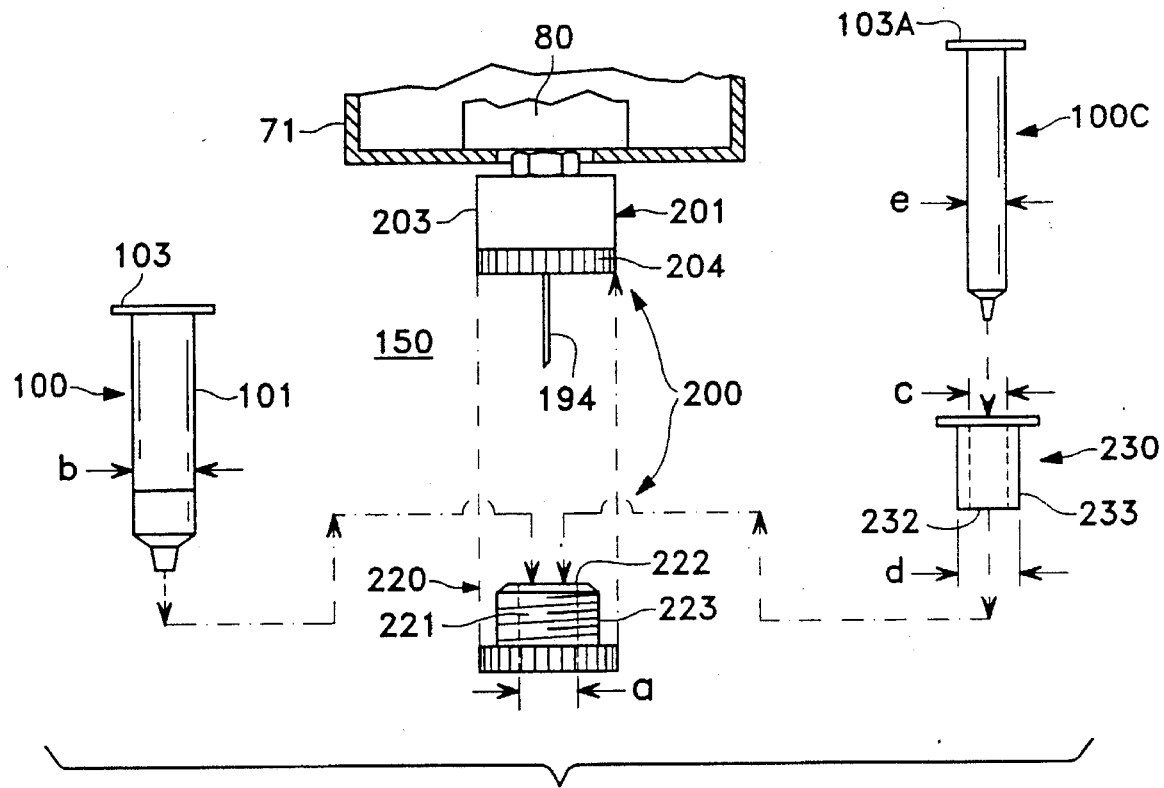
FIG. 7

SUPERCRITICAL FLUID EXTRACTION SYSTEM AND METHOD OF OPERATION

FIELD OF THE INVENTION

This invention relates to a supercritical fluid extraction system and method of operation thereof. More particularly the invention relates to supercritical fluid extraction apparatus combined with a variable restrictor and an adapter for extraction of certain components from a matrix and passage of such components to a standard type of collector for analysis thereof and to a method of operation of such system.

BACKGROUND OF THE INVENTION

Analytes are traditionally recovered from liquids and solid matrices using solvent extraction methods. By 1995, government-funded contract and selected Federal laboratories will be required by the Environmental Protection Agency (EPA) to reduce their uses of specified solvents by 50%. Supercritical fluid extraction (SFE) offers several advantages as a replacement for solvent-based techniques for analyte isolation and may aid laboratories in complying with such EPA regulations. Supercritical fluid's (SF's) advantageous properties are due to their behavior as solvents above their critical temperatures and pressures. Above the critical point, SFs exhibit properties which are more liquid-like than gaseous. Unlike liquids, SFs are highly compressible above the critical temperature and the density of the fluid increases with small changes in pressure. Although the density of an SF increases with pressure, the transport properties of the fluid remain between that of a gas and a liquid. Supercritical fluids have high diffusivities and low viscosities which may result in a rapid mass transfer of a solute from a sample matrix compared to a liquid. To be usable for analytical supercritical fluid extraction (SFE), a fluid must have certain critical properties such as a low critical temperature and pressure that place it within the operational range of available instrumentation. One fluid that has such properties is carbon dioxide, which has a critical temperature of 31° C. and a critical pressure of 1071 psi (74-bar). Additionally, carbon dioxide is non-toxic, available in high purity and disperses as a gas after depressurization. Because of its desirable properties carbon dioxide with or without modifiers is a preferred fluid for most SFE applications.

Conceptually, the design of a SFE apparatus is relatively simple. However, to fully exploit the potential properties of a SF, the design of each component of the apparatus must be optimized. In most SFEs, the fluid is compressed above its critical pressure using some type of high pressure pump. The compressed fluid then is passed through high pressure tubing into a temperature controlled environment above the critical temperature and through a heat exchanger prior to passage into an extraction vessel. The fluid, above the critical temperature and pressure, flows into the extraction vessel filled with the sample matrix. The SF, laden with solute, passes from the extraction vessel into a restrictor in which the SF is decompressed or depressurized. The restrictor is interfaced with a collector for liquid, open tube, or sorbent trapping. The decompressed gas is swept through the collector in which the sorbents are retained. The possibility of analyte loss at the restrictor/collector interface for most SFE designs is significant.

In general, most SFEs which are laboratory assembled or available commercially use one of two basic types of restrictor designs, fixed or variable flow. A fixed flow restrictor maintains a specific, constant flow rate for each pressure level dependent upon the inside diameter of the tubing used. Fixed restrictors are made from either fused silica capillary or stainless steel tubing. The internal diameters of these restrictors range from 5–55 μm. Because these restrictors are fabricated from narrow bore tubing, they are prone to various problems during operation. A pressure differential may occur along the length of the tubing of the fixed restrictor resulting in the deposition of polar analytes; plugging due to particulate carry over from the extraction vessel; solute deposition at the restrictor entrance; and blockage at the restrictor exit due to low temperature freezing of decompressed gases. The later phenomenon is especially apparent when biological samples, high in fat content, are extracted using SFE equipment with a fixed restrictor. The fat exiting the restrictor solidifies at the exit port causing blockage of flow. Fixed restrictors used in commercial SFEs normally are designed to direct the stream of depressurizing gas laden with solute into test tubes or vials where the analytes are trapped. The collection vessel may contain an organic solvent to assist in retaining the analyte. Current manufacturers whose instruments embody this design are Dionex of Sunnyvale, Calif., Isco of Lincoln, Nebraska, and Suprex of Pittsburgh, Pa.

Several types of variable flow restrictors have been proposed for use as pressure and flow regulators for supercritical fluid extractors. An automatic pulsed flow metering valve for SFE was reported by Saito et al. (Chromatographia 25,801, 1988). The unit has been commercialized by Jasco, Inc. of Easton, Md. This device operates by discharging the analyte into a collection tube or an optional fraction collector. A similar type of pulsed restrictor is offered by Hewlett-Packard of King of Prussia, Pa. on its SFE. The gas stream from the restrictor flows through a permanent solid phase extraction cartridge where analytes are collected. Analytes are recovered from the sorbent in this cartridge by pumping solvent through the cartridge. The solvent laden with analyte is deposited in vials located in an automatic sampler device.

Non-automated variable-flow restrictors are marketed by two companies as part of their SFEs. The Suprex Co. of Pittsburgh, Pa. uses a Variflow restrictor which consists of an elastic tube compressed by an elastic ferrule in a high pressure union. A variable restrictor distributed by CCS Corp. of Avondale, Pa. uses a similar concept in its design. Both devices may be difficult to heat uniformly. Additionally, interfacing such devices to accept standard commercial solid phase extraction (SPE) collectors may be difficult.

Micrometering needle valves have been used with considerable success as variable flow restrictors in supercritical fluid extraction applications. Such valves have a low coefficient of flow (Cv) to meter supercritical fluids at levels needed for analytical applications. To be useful in SFE apparatus, it is desirable that the metering valve be uniformly heated.

There are several manufacturers of micrometering valves which are suitable for use in SFE apparatus. Micrometering valves from Autoclave Engineering, Inc. of Erie, Pa., High Pressure Equipment Company of Erie, Pa. and Butech of Erie, Pa. have been tested and have performed satisfactorily.

As indicated, various types of solid-phase extraction collectors or columns are used with SFE apparatus. However, where routine sampling of products, as well as laboratory sampling is done, it is desirable, more efficient, and more convenient to make use of standard commercially available units. It is also preferable to standardize on the collectors used. Standard collectors come in several sizes, including 3 mL and 6 mL. The smaller unit has an inside diameter of 0.352 inches, a body length of 2.5 inches and an overall length of 2.94 inches. The larger unit has an inside diameter of 0.50 inch, a body length of 2.625 inches, and an overall length of 3.076 inches. Sorbent packing in such collectors has a nominal depth between 0.5 inch to 1.0 inch.

Notwithstanding, the availability of SFE apparatus and commercially available collectors, the accuracy and consistency of results utilizing such equipment is questionable. One of the factors contributing to problems with SFE apparatus and associated collectors may be the path length between the restrictors and SPE collectors and the means of their attachment to such restrictor. Extended length of the tubing pathway from a restrictor to a collector sorbent bed results in analyte deposition in the tubing rather than on the sorbent, a problem of critical importance when analytes are recovered in the ppm to ppb concentration range.

OBJECTS OF THE INVENTION

It is therefore an object of the invention to provide a supercritical fluid extraction system which provides for uniform heating of the depressurized gases as they exit the restrictor collector interface and reduces the path length between the point of depressurization of the supercritical fluid within the restrictor to the point where analytes are trapped in or on the collection device.

It is another object of the invention to provide an adapter interface that directly connects at its inlet end to a variable restrictor and directly connects at its discharge end to a collector alleviating the need for complicated tubing and collectors usually associated with such devices.

It is a further object of the invention to provide restrictor/collector means which allow for standard sized commercial SPE columns to be directly connected to metering valve variable restrictors.

It is a further object of the invention to provide a variety of restrictor/collector interfaces that are interchangeable with one another to permit the user of such devices to quickly switch from collection of analytes on sorbent beds to collection in open vials or test tubes.

It is a further object of the invention to provide a restrictor/collector interface that converts a variable restrictor to a fixed restrictor.

It is a further object of the invention to provide a supercritical fluid extraction system that makes use of an adapter interface having an orifice for controlling pressure and flow to the collector exclusive of the metering valve control.

SUMMARY OF THE INVENTION

The present invention overcomes the problems and disadvantages of the prior art apparatus by providing an SFE system for extracting a sample from a matrix by use of supercritical fluid and a collection of sample components therein in a collector. The system comprises a variable restrictor micrometering valve which is directly connected to the supercritical fluid extraction apparatus and uniformly heated, for depressurizing the supercritical fluid with the sample components therein and an adapter directly adapted with the restrictor and having means for sealingly engaging the collector and a conduit for the passage of depressurized fluid any sample components therein from the restrictor discharge orifice directly into the collector.

BRIEF DESCRIPTION OF THE DRAWINGS

FIG. 4 is an enlarged view, partially in section, of the heating block variable restrictor module and adapter of the present invention directly connected with a collector.

FIG. 5 is an enlarged view, partially in section, of the adapter shown in FIG. 4.

FIG. 6 is another embodiment of the adapter of this invention.

FIG. 7 is a break-away view of another embodiment of the apparatus of this invention and the manner of its assembly.

FIG. 7a is an enlarged view, partially in section, of a portion of the adapter of FIG. 7.

DETAILED DESCRIPTION OF THE PREFERRED EMBODIMENT

Figure 1:
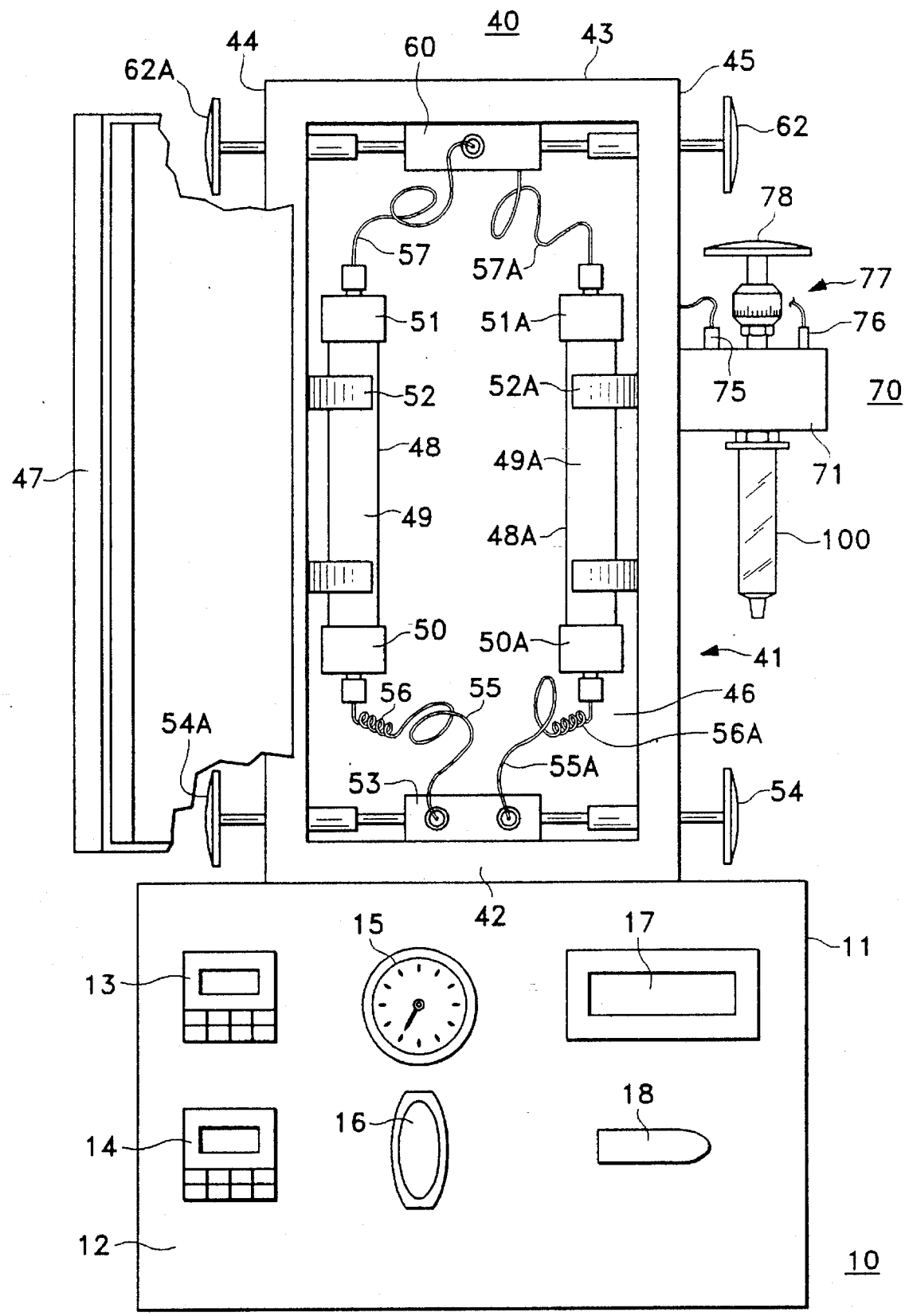
FIG. 1 is a schematic front view of the modular supercritical fluid apparatus for use with the present invention.
Figure 2:
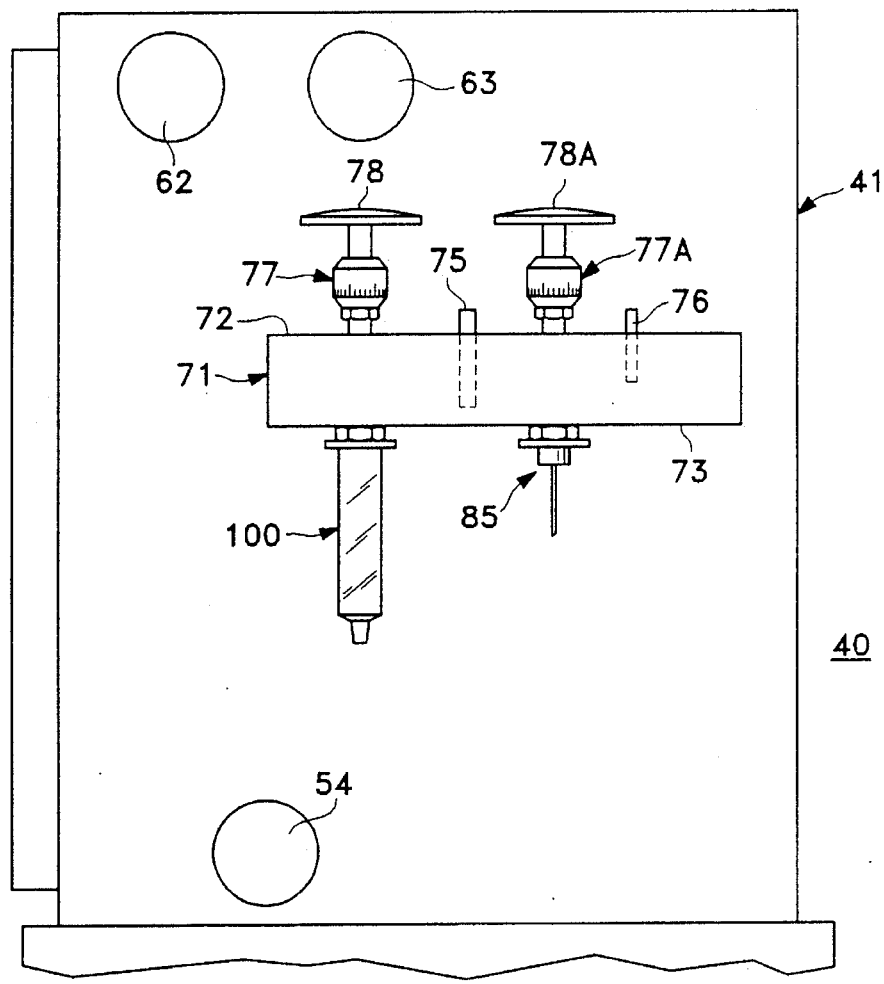
FIG. 2 is a schematic side view of the oven module portion of the supercritical fluid extraction apparatus of FIG. 1 coupled with a heating block variable restrictor module for use with the present invention.
Figure 3:
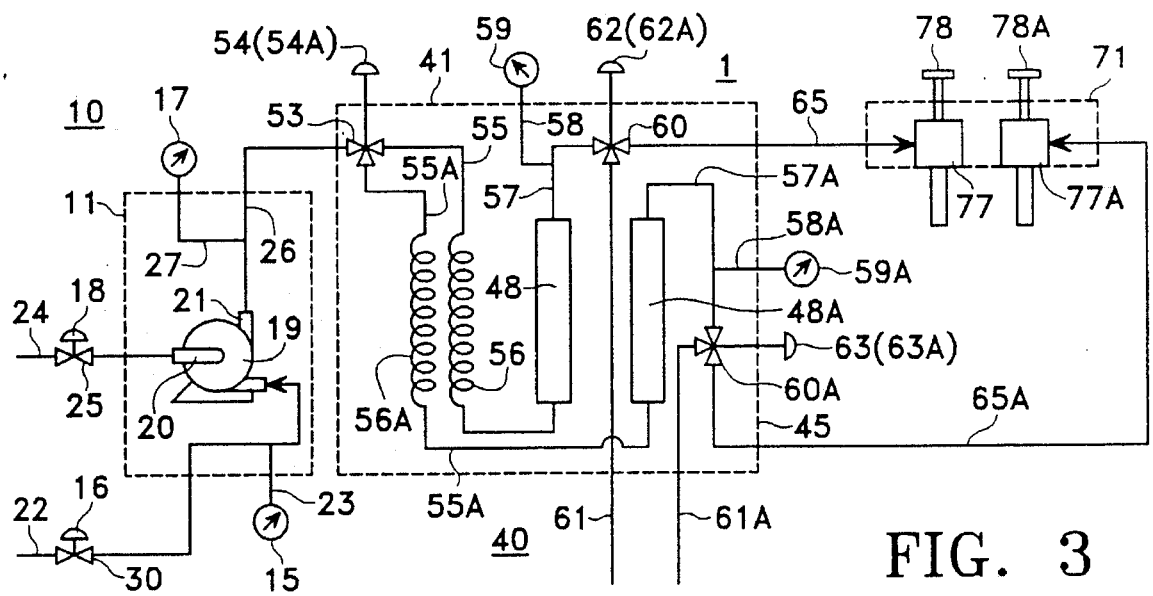
FIG. 3 is a schematic flow diagram of a supercritical fluid extraction system of the present invention.

Referring to FIGS. 1–3 there is shown supercritical fluid extraction system 1 comprising pump module 10, oven module 40, heating block variable restrictor module 70 directly connecting with adapter 85 which is directly connected to collector 100.

Pump module 10 includes housing 11, with instrument display panel 12 on one side thereof, having oven proportional controller 13, heating block proportional controller 14, air gauge dial 15, air line control valve handle 16, high pressure fluid flow monitor 17, and low pressure fluid flow control valve handle 18. As shown in FIG. 3 high pressure pump 19 is mounted within housing 11 and has pump inlet portion 20 and pump discharge portion 21. Pump 19 is operated by means of high pressure air which is fed from a source not shown, through air line 22 to pump 19. The passage of air through line 22 is controlled by valve 30 which is operated by handle 16 on control panel 12. The pressure of air in line 22 is shown on air gauge 15, which is on panel 12, that connects through tube 23 to air line 22. Low pressure fluid, preferably $CO_2$, from a source not shown, is fed through conduit 24 to pump inlet portion 20 and the flow of fluid through line 24 is controlled by valve 25, which is operated by handle 18 on panel 12. Compressed high pressure fluid from pump 19 passes through discharge portion 21 into high pressure fluid conduit 26. Pressure indicator 17 on display panel 12 which is connected to high pressure fluid conduit 26 by tube 27 shows the pressure of the fluid in such conduit.

Oven module 40 includes housing 41 having bottom 42, top 43, side 44, side 45, chamber 46, and door 47. Oven housing 41 is heated by means of heating elements, not shown, mounted within the housing walls. With door 47 closed the temperature within housing chamber 46 is maintained by oven proportional controller 13 mounted on pump module housing display panel 12. Mounted on the inside of housing side 44 by means of brackets 52 is extractor 48 having chamber 49, bottom cap 50 and top cap 51. Mounted on the inside of housing side 45 by means of brackets 52A is extractor 48A having chamber 49A, bottom cap 50A and top cap 51A. Mounted on the inside of housing bottom 42 is three-way valve 53 having operating handles 54 and 54A. Mounted on the inside of housing top 43 are three-way valve 60, with operating handles 62 and 62A, and three-way valve 60A with operating handles 63 and 63A, which are shown schematically only in FIG. 3.

High pressure fluid conduit 26 from pump 19 extends into oven module housing 41 to a first port of three-way valve 53. Extending from a second port of high pressure fluid line three-way valve 53 to the bottom cap 50 of extractor 48 is high pressure tubing 55 which includes coil portion 56. Extending from a third port of high pressure fluid line three-way valve 53 to the bottom cap 50A of extractor 48A is high pressure tubing 55A which includes coil portion 56A.

Extending from top cap 51 of extractor 48 to a first port of three-way valve 60 is high pressure tubing 57. Tube 58 extends from high pressure tubing 57 to pressure gauge 59. Extending from a second port of three-way valve 60 is vent line 61. Extending from a third port of three-way valve 60 and exiting oven housing 40 is tubing 65.

Extending from top cap 51A of extractor 48A to a first port of three-way valve 60A is high pressure tubing 57A. Tube 58A extends from high pressure tubing 57A to pressure gauge 59A. Extending from a second port of three-way valve 60A is vent line 61A. Extending from a third port of three-way valve 60A and exiting oven housing 40 is tubing 65A. Three-way valve 60 is operated by valve handles 62 and 62A, and three-way valve 60A is operated by valve handles 63 and 63A, which are shown schematically only in FIG. 3.

As best shown in FIGS. 2, 3 and 4, heating block/variable restrictor module 70 includes heating block 71 having top 72 and bottom 73 with bottom opening 74. Heating block 70 is fastened to oven module housing side 45 in a manner known to those skilled in the art, as, for example, by bolts. Extending through openings, not shown, in top 72 of heating block 71 are cartridge heater 75, which is operated by proportional controller 14 on pump module housing panel 12, and thermocouple 76. Cartridge heater 75 and thermocouple 76 operate proportional controller 14 to maintain the temperature within the block 71 at a desired level. Encased in heating block 71 are variable restrictor valves 77 and 77A which are operated by handles 78 and 78A, respectively.

High pressure tubing connecting with a third port of three-way valve 60 in oven module housing 41 extends through housing side 45 into heating block 71 and connects in a manner not shown, but known to those skilled in the art, with passageway 81 that extends through variable restrictor valve body 80 and has inlet orifice, not shown and discharge orifice 82 at the lower end thereof. Extending downwardly from valve handle 78 into valve body 80 is calibrated valve stem 79 which has a lower end that extends into valve body passageway 81 and is designed to engage a valve seat therein in a manner not shown but known to those skilled in the art. Movement of valve stem 79 downwardly causes the lower end thereof to engage such valve seat and close passageway 81 and movement of valve stem 79 upwardly causes the lower end thereof to disengage with such valve seat and open passageway 81. Extending upwardly from the bottom, undesignated, of valve body 80 of variable restrictor valve 77 is female threaded recess 83 having top 84 in which is centrally located valve body discharge orifice 82.

As shown in FIG. 3, high pressure tubing 65A connecting with a third port of three-way valve 60A in oven module housing extends through a housing side 45 into heating block 71 and connects in a similar fashion with the body of variable restrictor valve 80A which is of identical construction to that of variable restrictor valve 80.

As best shown in FIGS. 4 and 5, interface adapter 85 directly connects with the bottom of variable restrictor valve 77. Interface adapter 85 comprises nut portion 86, threaded upper portion 87, having flat top 88 and circular-shaped lower portion 89 having bottom surface 90. Extending vertically and longitudinally through the center of adapter 85, i.e. through upper portion 87, nut portion 86 and lower portion 89, is passageway 93. Tubing 94 with upper end 95 and lower end 96 extends through adapter passageway 93 and has central longitudinal conduit 97. As best shown in FIG. 5, surrounding adapter lower portion 89 and bottom surface 90 is sleeve 98 which has an outside diameter d. Adapter 85 has an overall length G, the distance from the bottom of nut portion 86 to upper portion top 88 is H, and the distance from the bottom of nut portion 86 to tube lower end 96 is Q. Dimension H is about ¾ inch and dimension Q is between about ¾ inch to 1¾ inches, preferably about 1 inch to 1⅝ inches.

Threaded upper portion 87 of adapter 85 is threaded into female threaded recess 83 in the bottom of body 80 of variable restrictor valve 77 so that top 88 of adapter upper portion 87 seats flush with top 84 of valve body recess 83 to form a high pressure gas-tight seal and discharge orifice 82 of valve body passageway 81 aligns with conduit 97 of adapter tubing 94.

FIG. 4 shows collector tube 100 directly connected to interface adapter 85. Collector tube 100 comprises body portion 101 having inner surface 102, with inside diameter D, top flange 103, and lower end 104 with opening 105. Absorbent material 106, is packed above tube body lower end 104, between porous plastic discs 107 and 108, commonly called frits. Collector tube 100 has an overall length K, body portion 101 has a length L, and absorbent material 106 and plastic discs 106 and 107 have a depth M. The inside diameter D of collector tube 100 is of a size to slide, with slight interference, e.g. 0.010 inch, over sleeve 98, of interface adapter 85, both to form a gas-tight seal and to hold collector tube 100 securely in position during collection of analyte, while permitting easy removal of the collector tube thereafter. Sleeve 98 has a height P and tubing 94 has a length Q from the bottom of adapter nut portion 86 to tube lower end 96. The distance from tube lower end 96 to the top of plastic disc 107 is N and to the bottom of valve body 80 is S.

The preferred fluid used with the above described supercritical fluid extraction system is carbon dioxide because of several desirable properties, e.g. it is non-toxic, available in high purity, and disperses as a gas after depressurization. $CO_2$ is compressed above its critical pressure of 1071 psi (74 bar) by pump 19 which, for example, is capable of delivering pressurized liquefied gas at a pressure of at least 10,000 psi (680 bar). One such pump is model ASF-150 manufactured by Haskel Engineering Co. of Burbank, Calif. Oven module 40 is of a type manufactured by Applied Separations, Inc. of Allentown, Pa., model 7700 oven. Variable restrictor micrometering valves 77 and 77A are of a type manufactured by Autoclave Engineering, Inc. of Erie, Pa., model 10VRMM2812 and are used to control flow rates and depressurize compressed fluids. Collector tube 100 is of a type manufactured by Applied Separations Corporation of Allentown, Pa., containing, e.g. various types of sorbent material 106, dependent upon the analyte to be retained on the sorbent. Sorbent materials include alumina, Florsil, and silicas, such as silica gel or bonded silicas, as for example octadecyl or octahexyl silica.

Preferably plastic sleeve 98 is formed from a polyetheretherketone (PEEK) rod fabricated to fit over adapter lower portion 89 and bottom surface 90 and is secured thereto with epoxy resin. Other insulating polymeric materials may be used for sleeve 98. Sleeve 98 partially insulates the top of collector 100 from the heated surfaces of adapter 85 and heating block variable restrictor 70 and insures a gas-tight seal with collector 100. The sleeve is a necessary addition to the design because collector 100, usually made of polypropylene, softens and loosens its seal when in contact with heated metal surfaces at the valve operating temperatures.

ALTERNATIVE EMBODIMENTS

Referring to FIGS. 6, 7 and 7A, there is shown adapter assembly 150 comprising adapter 185 and collector/retainer assembly 200. Adapter 185 comprises nut portion 186 with threaded upper portion 187, having flat top 188, passageway 193 extending longitudinally therethrough, and tube 194 having lower end 195 and upper end 196, which is attached to nut portion 186 by the brazing or by a flange arrangement.

Tubing 194 has an opening, extending the length thereof, which is in communication with passageway 193 of adapter nut portion 186. Threaded upper portion 187 of adapter 185 is threaded into restrictor valve body 80 in the manner described above with the preferred embodiment.

Adapter 185, as shown in FIG. 6, may be used alone to direct depressurized gases containing analytes into collection vessels such as test tubes or vials when analyte trapping does not involve the use of solvents. Under such circumstances the test tubes or vials may be dry prior to depressurization of the gases. On the other hand, test tubes or vials may contain organic solvent such as hydrocarbons, acetone, methanol, etc. which are used to trap analytes from the depressurized gases.

Collector/retainer assembly 200 comprises circular upper nut 201 having top portion 202, side 203 with knurled lower periphery 204 and bottom 205. Extending inwardly from upper nut bottom 205 is female threaded recess 206 having bottom 207. Passageway 208 extends upwardly through the center of upper nut top portion 202. Passageway 208 has female threaded lower portion 209, conical portion 210, and top orifice 211. Adapter 185 is assembled with collector/ retainer assembly 200 by inserting tube 194 connected to the adapter through top orifice 211 of upper nut passageway and downwardly therethrough until the bottom of adapter nut portion 186 is against collector/retainer assembly upper nut top portion 202. Adapter 185 is locked in place in upper nut 201 by tightening inner nut 212 against the bottom of ferrule 215, which in turn compresses the thin upper portion of the ferrule against tubing 194.

Collector/retainer assembly 200 further comprises retaining nut 220 having smooth surface opening 221 extending longitudinally through its center, retaining nut top 222, retaining nut male portion 223 and retaining nut bottom peripheral knurled portion 224.

When adapter 185 is secured to collector/retainer assembly upper nut 201 and the threaded upper portion 187 is threaded into restrictor valve body threaded recess 83, adapter assembly 150 may be used with two sizes of standard commercial solid phase extraction collectors 100 and 101C. In the first instance 6 ml collector 100 may be inserted through opening 221 extending longitudinally through the center of retaining nut 220 so that collector flange 103 rests on top 222 thereof. Retaining nut 220 is moved upwardly and male threaded portion 223 is threaded into female threaded recess 206 of collector/retainer assembly upper nut 201 so that the top of collector flange 103 is compressed and sealed against upper nut recess bottom 207. As shown in FIG. 7, the outside diameter b of collector 100 is slightly smaller than the inside diameter a of retaining nut opening 221 so that collector body 101 easily slides through retaining nut opening 221.

As shown in FIG. 7, adapter/collector retainer assembly 150 also can accommodate a standard 3 mL solid phase extraction collector 100A when used in conjunction with sleeve 230. Sleeve 230 has flange 231, circular opening 232 and circular outside surface 233. Collector 100C is inserted through sleeve opening 232 until collector flange 103A rests on sleeve flange 231. Sleeve opening 232 has a diameter c which is slightly larger than outside diameter e of collector 100C which enables it to slide easily through sleeve opening 232. Sleeve 230 with collector 100A is inserted through opening 221 of collector/retainer assembly retaining nut 220 until sleeve flange 231 rests on top of retaining nut top 222. Retaining nut 220 containing sleeve 230 and collector 100A is threaded into recess 206 of collector/retainer assembly upper nut 201 so that the top collector flange 103A is compressed against upper nut recess bottom 207 forming a gas-tight seal.

Figure 8:
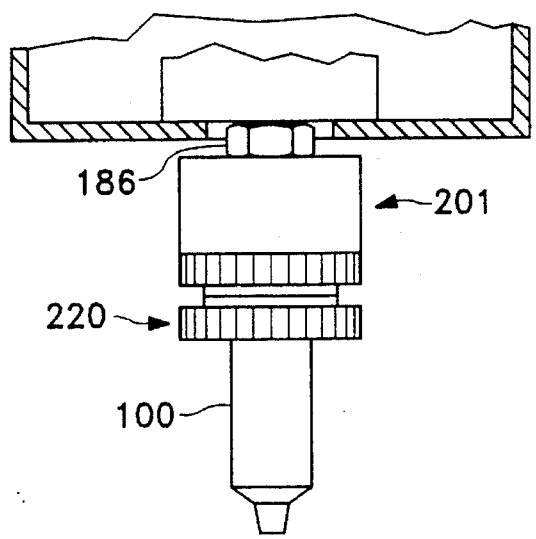
FIG. 8 is a view of another embodiment of the invention.

In FIG. 8 is shown another embodiment of the invention. The embodiment of the invention is similar to that shown in FIG. 7 with the exception that collector/retainer assembly upper nut 200 is braised directly to nut portion 186 of adapter 185. This assembly may be interchangeably attached to restrictor valve 80 as with the other adapters described above. Both 6 mL and 3 mL standard commercial collector tubes 100 and 100A, respectively, may be used with this arrangement.

Figure 11:
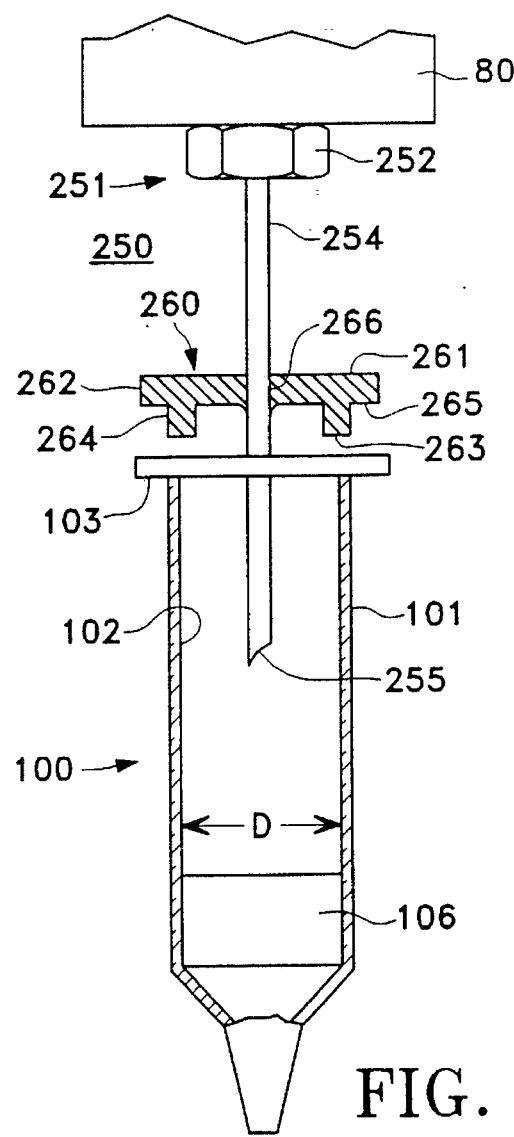
FIG. 11 is an enlarged view, partially in cross section, of another embodiment of this invention.

Another embodiment of the invention is shown in FIG. 11. Adapter/cap assembly 250 comprises adapter 251 and cap 260. Adapter 251 is identical in design to adapter 185 shown in FIG. 6. Adapter 251 comprises adapter nut portion 252, stainless steel tubing 254 having ¹⁄₁₆-inch diameter and tubing lower end 255 with an angled side bevel. Cap 260 comprises top portion 261, top portion side 262, downwardly projecting circular ledge 263, ledge side surface 264, shelf 265 extending around the outer periphery of the bottom of cap top portion 261 and aperture 266. Cap 260 may be made from any rigid polymeric material such as polyethylene, polypropylene or Teflon, although not limited to such materials. Cap 260 has a central hole, approximately ¹⁄₃₂ inch in diameter, adapter/cap assembly 250 is used with a collector 100 by first inserting cap circular ledge 263 into collector 100 in a manner to have ledge side surface 264 in contact with collector inner face 102 and pushing down on cap top portion 261 to force shelf 265 extending on the bottom periphery thereof against the top surface of collector flange 103 forming a gas-tight seal. Thereafter adapter tubing lower end 255 is inserted into cap top opening 266 thereby enlarging the hole to the outside diameter of the tubing. Collector tube 100 is moved upwardly on tubing 254 until cap top portion 261 makes contact with the bottom of adapter nut portion 252. Collector 100 may be secured in place in any convenient manner, as, for example, by a clamp.

Figure 10:
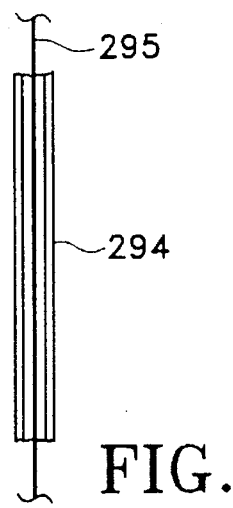
FIG. 10 is an enlarged sectional view taken along the line 10—10 of FIG. 9.
Figure 9:
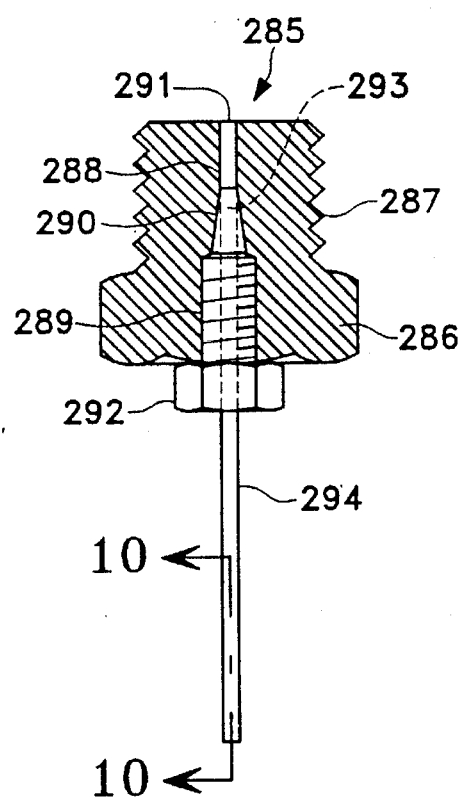
FIG. 9 is a view of another embodiment of the present invention.

The embodiment of the invention shown in FIGS. 9 and 10 is different conceptionally from the adapters shown in FIGS. 4–8 and 11. Those adapters were designed to carry depressurized gases containing analytes from the variable restrictor 77 through a discharge tube 94, 194, and 254 to a collector 100 or 100C. Adapter 285 instead converts variable restrictor 77 into a fixed restrictor having a constant rather than a variable flow rate. This is accomplished in the following manner. Adapter 285, instead of caliber stem 79 of variable restrictor valve 77, controls pressure and flow rate through discharge tube 294, when valve 77 is fully opened allowing unrestricted flow of high pressure supercritical fluid into adapter 285. Adapter 285 is an assembly consisting of two components. Connector nut 286 has threaded upper portion 287 and passageway 288 extending longitudinally through the center thereof. Passageway 288 has female threaded lower portion 289, conical intermediate portion 290, and upper inlet portion 291. Discharge tube 294 comprises a length of modified 1/16" stainless steel tubing having an internal diameter of approximately 0.02" to which is attached a stainless steel ferrule 293. A length of fused silica capillary tubing, manufactured by Polymicro Technologies, Inc. of Phoenix, Ariz., having an approximate outside diameter of 360 mm is coated with a two-part epoxy cement and inserted into the bore of discharge tubing 294 and heat cured. Representative diameters of such silica tubing ranges from 5 mm to 65 mm, and a desired flow rate through the capillary is determined by the inside diameter of the silica tubing. In FIG. 10 fused silica capillary 295 is shown inserted in tubing 294.

To operate variable restrictor 77 in the fixed restrictor mode, the upper portion 287 of connector nut 286 of adapter 285 is screwed into variable restrictor valve 77. Tube 294 with ferrule 293 is inserted into connector nut 286 and secured in place with nut 292. Stem 79 of restrictor valve 77 is opened fully. Pressure and flow rates of gases through restrictor valve 77 now are controlled by adapter 285. Flow rates of gases through adapter 285 are dependent on the inside diameter of the fused silica tubing 295. Flow rates may be selected over range of 100 mL/min. to 5 L/min. and varied accordingly with increasing inside diameter of the fused silica capillary tubing.

Depressurized gases exiting from adapter 285 may be directed to an open collection vessel such as a test tube or vial, or the analyte(s) may be collected on a sorbent and a collection tube 100 or 100C using adapters shown in FIG. 7.

The adapters shown in FIGS. 4–8 have been used with variable restrictors to collect several classes of compounds from biological matrices in the manner following.

In a first example, samples such as fortified muscle and liver tissues, frankfurters and ham were blended with Hydromatrix (Supercritical Fluid Extraction Enhancer, PB-238114 made by Varian Sample Preparation Products, Harbor City, Calif.) to form free flowing powders. These powders were loaded into extraction vessels, e.g. 48, 48A and the system was pressurized with carbon dioxide using an air driven liquid pump 19.

In the first example, three nitrobenzamide antimicrobial drugs, aklomide, nitromide and zoalene were added at levels of 4 µg each to homogenized liver samples. The fortified samples were mixed with Hydromatrix and loaded into extraction vessels 48 or 48A.

Comparisons were made between the standard interface adapter which is supplied as original equipment for the variable restrictor 77 and the adapters described above with respect to types 4–8.

A comparison of the results obtained for these two types of adapters are shown in Table 1. In Table 1, the results shown in the columns labeled Separated Adapters are for those obtained when the original equipment adapter was connected to the micrometering valve variable restrictor 77. Those results shown in the column labeled Intregal Adapter are those obtained when the devices shown in FIGS. 4–8 were connected to such variable restrictor.

TABLE 1

Recovery of three nitrobenzamide antimicrobial drugs from SPE columns attached to separated and intregal valve-collector assemblies.

| | Liters of expanded carbon dioxide | | | |
|---|---|---|---|---|
| | Separated Adapters | | | Integral Adapters |
| Compounds | 50 L | 100 L | 150 L | 60 L |
| Aklomide | 50 | 71 | 86 | 96 |
| Nitromide | 41 | 55 | 71 | 82 |
| Zoalene | 52 | 70 | 83 | 88 |

When the separated adapter was used to extract these antimicrobial drugs up to 150 L of expanded carbon dioxide was needed to partially extract the drugs from the sample matrix (Table 1). When the intregal adapter was used, as shown in the last column of Table 1, only 60 L of expanded gas was needed to extract the analytes in high yields. The differences observed for analyte recovered between the two types of interface adapters is due to the improved design of the integral adapters described herein.

In a second example, frankfurters were fortified with 10 nitrosamines each at the 20 ppb level. The abbreviated names for these compounds are listed in the left hand column of Table 2. The fortified samples were mixed with Hydromatrix as described for example 1 and transferred to extraction vessels. Extractions were carried out in supercritical fluid extraction apparatus, at an oven temperature of 40° C. and a pressure of 10,000 psi. The total elapsed time for each extraction was 19 minutes with a flow rate of depressurized carbon dioxide of 3 L/min. and a static holding period of 2 minutes. The micrometering valve variable restrictor 77 was fitted with the adapter shown in FIGS. 4 and 5. The collector 100 was packed with 1 gram of silica gel to retain the extracted analytes. The depressurized carbon dioxide gas passed through the silica gel sorbent in the solid phase collectors depositing a mixture of extracted fat and nitrosamines. Extracter 48 was removed from tubing 57. A connection was attached to tubing 57 so that a syringe barrel having a Luer fitting could be attached. A small amount of hexane (0.25 mL) was pumped through this tubing and through discharge tube 94 into collector 100 to flush remaining extracted material.

Collector tube 100 then was removed from interface adapter 85 for post SFE nitrosamine recovery. The sorbent bed containing the nitrosamine-fat matrix first was washed by 2×4 mL portions of 25% dichlormethane in pentane. These washings containing the recovered fat were discarded. The nitrosamines then were eluted from from collector 100 by passing 2×4 mL of a mixture of 30% ethyl ether in dichlormethane through the sorbent bed. These washings were collected in a 10-mL concentrator tube, which was then attached to a micro Snyder column and the washings were concentrated at 70° C. to a 1.0 mL volume. To determine the recovery of the nitrosamines the solution was injected into a gas chromatograph interfaced to a nitrosamine specific chemiluminescent detector (GC-TEA). The limit of detection for the 10 nitrosamines range from 1.0 ppb for NDMA to the highest of 3.0 ppb for NDBA.

The results obtained for nitrosamine recovery from fortified frankfurters in this study are shown in Table 2.

TABLE 2

SFE Recovery of 10 Nitrosamines from Fortified* All-Meat Frankfurters

| N-Nitroso Compounds | Range (%) | Mean≠ (%) | RSD (%) | CV (%) |
|---|---|---|---|---|
| NDMA | 94.0–100.9 | 97.50 | 2.85 | 2.92 |
| NMEA | 87.0–92.61 | 89.45 | 2.34 | 2.62 |
| NDEA | 84.3–92.5 | 88.35 | 2.83 | 3.20 |
| NDPA | 84.8–98.6 | 92.37 | 6.13 | 6.34 |
| NAZET | 94.3–104.8 | 100.57 | 3.55 | 3.53 |
| NDBA | 92.2–101.8 | 95.22 | 3.54 | 3.72 |
| NPIP | 91.1–101.8 | 97.80 | 5.89 | 6.02 |
| NPYR | 91.0–103.2 | 95.17 | 4.41 | 4.63 |
| NMOR | 97.1–100.9 | 100.86 | 3.87 | 3.84 |
| NHMI | 91.5–102.0 | 97.62 | 4.06 | 4.16 |

*Fortified level — 20 ppb/nitrosamine.
≠Average of 6 determinations

High recoveries of all 10 nitrosamines were obtained in these experiments with low relative standard deviations (RSD) and coefficients of variation (CV). Trapping of nitrosamines on the silica gel sorbent in the collector tubes 100 facilitated their separation from fat which is coextracted as an unwanted artifact along with analytes of interest.

In designing a collection system for trapping solutes such as nitrabenzamaide antimicrobials and nitrosamines from tissue matrices, two problems were addressed: first, the need to quantitatively collect the analyte-fat mixture; and second, the need to separate the analyte from the fat after extraction for subsequent chromatographic analysis. The preferred embodiment described above addresses both difficulties by providing a restrictor/collector interface, i.e. adapter 85, which allows for the collection of solutes directly on the frit above the sorbent bed of commercial solid-phase extraction collectors 100. Interface adapter 85 shortens the path length between the restrictor and the collector reducing analyte losses in the restrictor and tubing. Additionally, by choosing the appropriate sorbent for collector tube 100, complex extracted mixtures may be separated into their component parts for post SFE analysis using manual or automated operations.

This application of the integral adapter of this invention attached to commercial solid phase extractors is of interest to agencies such as the Food Safety Inspection Service (USDA) for use in their regulatory laboratories where solvent intensive methods for nitrosamines recovery are performed routinely.

In the preceding description of the supercritical fluid extraction system and its method of operation, certain specific parameters were identified and applicable comments made. As with other equipment and processes, there are ranges of operation and sizes of elements not previously mentioned. For example, heating block 71 may be maintained at a temperature range between 90° C. to 150° C. The temperature of the fluid leaving collector lower end opening 105 is between 50° C. to 60° C. at a set flow rate of 3 L/min., which causes a slight elevation in temperature of sorbent material 106. Collector 100 is at ambient temperature and there is no cooling associated with sampling as is done with certain other apparatus and systems.

Collector 100 is shown with flange 103 which is a preferred design for a standard collector. Under certain circumstances, the flange may be removed and body 101 cut to any desired length, in which event it will still engage adapter sleeve 98. By reducing the length of collector body 101, the lower end 96 of tubing 94 may be placed any desired distance above plastic disk 107 which is above the sorbent material 106. Tubing 94 may be shortened to a length no more than ⅝ inch below the bottom of adapter nut portion 86 to accommodate, if necessary, any reduction in length of collector body 101.

As used herein the term "directly" e.g. "directly connected" means proceeding by the shortest route marked by the absence of an intervening element.

I claim:

1. In combination with means for extracting a sample from a matrix by use of supercritical fluid and the collection of sample components therein in a solid phase extraction column means, the improvement comprising:
   (A) restrictor means for depressurizing the supercritical fluid with the sample components therein and having:
      (1) a discharge orifice; and
   (B) adaptor means connected with said restrictor means having:
      (1) a conduit extending therethrough for the passage of the depressurized fluid and the sample components from said restrictor discharge orifice into a solid phase extraction column means;
      (2) a top portion connecting with said restrictor means; and
      (3) a bottom portion extending into said solid phase extraction column means.

2. The invention of claim 1 further comprising heating means for maintaining said restrictor means at a substantially uniform temperature.

3. The invention of claim 1 wherein said adaptor means further includes a means for sealingly engaging said adaptor means with a collector.

4. The invention of claim 3 wherein said means for sealingly engaging said adaptor means with a collector has temperature insulating means about the periphery thereof.

5. The invention of claim 1 wherein said adaptor means bottom portion has a length between about 0.625 inch and 1.750 inches.

6. The invention of claim 1 wherein said adaptor means has an overall length of between 1½ inches and 3¼ inches.

7. The invention of claim 1 wherein said adaptor means further includes an intermediate portion directly connected with said solid phase extraction column means.

8. In combination with means for extracting a sample from a matrix by use of supercritical fluid extraction means and solid phase extraction column means for collecting at least one component of said sample, the improvement comprising:
   (A) variable restrictor means comprising:
      (1) a body having a discharge orifice; and
   (B) adaptor means comprising:
      (1) a first end portion connecting with said variable restrictor means;
      (2) a second end portion extending into said solid phase extraction column means; and
      (3) an intermediate portion connecting with said solid phase extraction column means.

9. The invention of claim 8 further including heating means for maintaining said restrictor means at a substantially uniform temperature.

10. The invention of claim 8 wherein said adaptor means intermediate portion has an outside diameter larger than the inside diameter of said solid phase extraction column means for gas-tight slip engagement therewith.

11. The invention of claim 10 wherein said adaptor means intermediate portion has temperature insulating means about the periphery thereof.

12. The invention of claim 8 wherein said adaptor means second end portion has a length between about 0.625 inch and 1.750 inches.

13. Supercritical fluid extraction system for extracting a sample from a matrix and collecting at least one component thereof for analysis, comprising
   (A) supercritical fluid extraction means including:
      (1) a housing;
   (B) variable restrictor means mounted adjacent and in fluid communication with said supercritical fluid extraction means housing;
   (C) solid phase extraction column means for collecting said at least one component of said sample; and
   (D) adaptor means comprising:
      (1) a first end portion connecting with said variable restrictor means,
      (2) a second end portion extending into said solid phase extraction column means, and
      (3) an intermediate portion connecting with said solid phase extraction column means.

14. The invention of claim 13 further including heating means for maintaining said restrictor means at a substantially uniform temperature.

15. The invention of claim 13 wherein said adaptor means intermediate portion has an outside diameter larger than the inside diameter of said solid phase extraction column means for sliding engagement therewith.

16. The invention of claim 13 wherein said adaptor means intermediate portion has temperature insulating means about the periphery thereof.

17. The invention of claim 13 wherein said adaptor means second end portion has a length between about 0.625 inch and 1.750 inches.

18. The invention of claim 13 wherein said adaptor means first end portion directly connects with said restrictor means.

19. The invention of claim 13 wherein said adaptor means intermediate portion directly connects with said solid phase extraction column means.

20. In combination with means for extracting a sample from a matrix by use of supercritical fluid extraction means, variable restrictor means, and first and second solid phase extraction column means each having an upper flange portion, for collecting at least one component of said sample, the improvement comprising:
   (A) an adaptor for each of said first and second solid phase extraction column means, each adaptor comprising:
      (1) a first end portion directly connecting with said variable restrictor means,
      (2) a second end portion extending into said respective solid phase extraction column means; and
      (3) an intermediate portion connecting with said respective solid phase extraction column means.

21. The invention of claim 20 wherein said adaptor intermediate portions comprise a collector retainer assembly comprising:
   (A) a first portion having:
      (1) a top portion having:
         (a) a passageway extending therethrough;
      (2) a recess extending upwardly therein having:
         (a) a side surface; and
         (b) a bottom surface; and
   (B) a second portion having:
      (1) an opening therein, having:
         (a) a first diameter, extending centrally therethrough for passage of said respective solid phase extraction column means; and
         (b) a top for supporting said respective solid phase extraction column means flange portion; and
         (c) an outer surface for through passage through said first portion passageway.

22. The invention of claim 21 further comprising:
   (A) a sleeve for passage through said collector retainer assembly second portion and assembly therewith in said collector retainer assembly having:
      (1) an outer surface having:
         (a) a second diameter smaller than the diameter of said collector retainer assembly second portion opening;
      (2) an opening therethrough having a third diameter for passage of said solid phase extraction column means; and
      (3) a top flange for supporting on the upper surface thereof said solid phase extraction column means upper flange portion in engagement with said collector retainer assembly second portion top.

23. A method of collecting a sample of at least one component of a matrix extracted in a fluid at supercritical pressure and temperature from supercritical extraction means comprising:
   (A) passing said fluid and said sample into restrictor means;
   (B) increasing the temperature of said fluid and said sample;
   (C) discharging said fluid and said sample from said restrictor means and controlling the rate of discharge and reducing the temperature and pressure thereof;
   (D) passing said fluid and said sample to an integral adaptor directly connected with said restrictor means; and
   (E) discharging said fluid and said sample from said integral adaptor to a directly connected solid phase extraction tube having adsorbent material therein for trapping said sample, said adaptor extending into said tube.

24. The invention of claim 23 wherein said restrictor means is maintained at a temperature of between 90° C. and 150° C.

25. The invention of claim 24 wherein said restrictor means is maintained at a temperature of between 90° C. and 150° C.

26. The invention of claim 24 wherein said integral adaptor is directly connected in a gas-tight slip connection manner with said solid phase extraction tube.

27. The invention of claim 24 wherein said fluid and said sample flow through said integral adaptor a distance between ¾ inch and 1¾ inches within said solid phase extraction tube.

28. A supercritical fluid extraction system for extracting a sample from a matrix and collecting at least one component thereof for analysis comprising:
   (A) a supercritical fluid extraction means including:
      (1) a housing;
   (B) a variable restrictor means mounted adjacent said supercritical fluid extraction means housing;
(C) a collector means for collecting at least one component of said sample; and
(D) adaptor means comprising:
  (1) a first end portion connecting with said variable restrictor means; and
  (2) a second end portion extending into said collector means.

* * * * *